Aug. 2, 1960 D. B. SPALDING 2,947,143
BAFFLE ARRANGEMENT FOR COMBUSTION EQUIPMENT
Filed Oct. 12, 1953 2 Sheets-Sheet 1

INVENTOR
Dudley B. Spalding
BY Stevens, Davis, Miller & Mosher
his ATTORNEYS

Aug. 2, 1960     D. B. SPALDING     2,947,143
BAFFLE ARRANGEMENT FOR COMBUSTION EQUIPMENT
Filed Oct. 12, 1953     2 Sheets-Sheet 2

INVENTOR
Dudley B. Spalding
BY Stevens, Davis, Miller & Mosher
ATTORNEYS

United States Patent Office 2,947,143
Patented Aug. 2, 1960

2,947,143

BAFFLE ARRANGEMENT FOR COMBUSTION EQUIPMENT

Dudley B. Spalding, Cambridge, England, assignor to National Research Development Corporation, London, England, a British corporation Filed Oct. 12, 1953, Ser. No. 385,662

Claims priority, application Great Britain Oct. 15, 1952

6 Claims. (Cl. 60—39.72)

The invention relates to combustion systems or equipment for burning fuel in a ducted stream of combustion supporting gas and is applicable, for example, to combustion equipment for gas turbine jet engines or other gas turbine plants.

It has previously been proposed to provide combustion equipment in which flame-stabilizing baffles are provided in a ducted stream of combustion supporting gas; but many of these proposals suffer from the disadvantages that the flame is not sufficiently stabilized and is extinguished by the gas stream or that combustion is incomplete. It is an object of the present invention to provide improved equipment which tends to overcome these difficulties.

The present invention provides equipment for burning vaporific fuel in a stream of combustion supporting gas comprising a duct defining a path for the said gas stream, a portion of the duct having greater cross-sectional area than a portion immediately upstream thereof and so shaped as to contitute a sudden and substantial enlargement in the duct, a flame-stabilizing baffle so positioned in the region of said sudden enlargement as to deflect at least part of the gas stream into the enlarged portion, the baffle together with the sudden enlargement causing at least part of the said gas stream to be deflected through a substantial angle and recirculation of gas in the enlarged portion, means for introducing fuel into said recirculating gas and ignition means for said fuel and gas.

The baffle may, for example, be constituted by a cascade of blades of aero-foil section of which at least several are stalled.

According to one aspect of the invention the baffle causes only part of the gas stream to be recirculated in the said enlarged portion, another path being provided for another part of the gas stream, the stream being reunited downstream of the flow dvision. The said other path is preferably constructed as an efficient diffuser, the combustion supporting gas stream flowing therethrough being used as dilution "air." A plurality of baffles may be provided so dividing the gas stream as to flow through a multiplicity of combustion paths and diffusing paths.

According to another aspect of the invention, when the baffles are constituted by a cascade of aero-foil shaped blades, some or all the blades may be movable between stalled and unstalled positions.

Fuel may be supplied in a number of different ways. For instance it may be introduced as a mixture with the gas stream. It may be sprayed as a liquid into the gas stream upstream of the baffle or spread as a film over the baffle and continually evaporated therefrom. Fuel may be introduced directly into the recirculating zone, for example, as a spray of liquid fuel. Flame spreading means may be incorporated.

Numerous applications of the invention can be foreseen; for instance such combustion equipment may be applied to ram jet apparatus, to gas turbine engines for main or reheat combustion, to pressure exchangers and to other plants in which heat energy is liberated by combustion.

The invention will now be described with reference to certain embodiments thereof shown in the accompanying drawings, in which.

Figure 1:
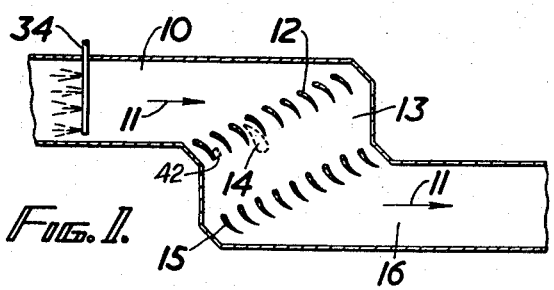
Figure 1 is a section through a duct in which combustion equipment according to the present invention is installed.

Referring to Figure 1, reference numerals 10, 13 and 16 represent portions of a duct through which combustion supporting gas, for example, air, is passing in the direction of arrows 11. The duct may have any cross-section e.g. circular or annular. The gas stream undergoes a double right-angled bend in its passage from portion 10 to portion 16. The distance between the duct walls is much larger in the intermediate portion 13 than in the portions 10 and 16. The enlargement, for instance, may be as much as 4 to 1. At the first right-angled bend between the portions 10 and 13 there is a cascade 12 of aero-foil section blades. These blades are partially stalled so as to provide in their wake sheltered regions in which combustion may occur. At the second right-angled bend between the portion 13 and the portion 16 there is a second cascade 15 of aero-foil section blades. The blades of the cascade 12 and the sudden enlargement from portion 10 to portion 13 of the duct together cause diffusion and therefore compression of the gas. Similarly, the blades of the cascade 15 and the sudden contraction between the portion 13 and the portion 16 of the duct together cause expansion. Therefore, cascade 12 is referred herein as a compressor cascade and the cascade 15 is referred to as an expansion cascade. The portion 13 constitutes a combustion zone, fuel being burnt in the wake of the stalled blades of the compressor cascade 12, as indicated by the dotted lines at 14. Fuel is introduced into the gas stream by a fuel pipe 34 directed upstream, the fuel being carried by the combustion supporting gas into the combustion zone 13. The combustion products re-deflected from the portion 13 to the portion 16 are then conducted away to perform useful work, for example, in driving a turbine or as a source of heat.

The general arrangement shown in Figure 1 may be modified by having one or more efficient and unstalled cascades upstream of the stalled blades of cascade 12 so as to produce some pressure rise and velocity fall in combustion supporting gas approaching the combustion zone. In such cases the blades of the stalled compressor cascade 12 would be so arranged as to miss the wake of the compressor blades upstream thereof. It may be desirable in some circumstances to link up the stalled compressor blades of the cascade 12 and the expansion blades of the cascade 15 respectively as continuous elements.

Figure 2:
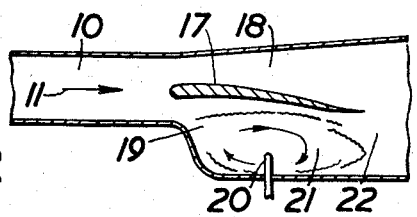
Figure 2 is a diagram of combustion equipment in which combustion and dilution gas streams are kept separate.

Another embodiment of the invention is shown diagrammatically in Figure 2. Again there is a duct 10 through which combustion supporting gas is flowing in the direction of arrow 11. In the path of the gas stream 11 there is a baffle plate 17 which divides the stream of gas into two parts, one of which continues through an efficient diffusing passage 18 and forms a dilution stream and the other part of which is deflected into an enlarged part of the duct at 19. In this enlarged part of the duct there is recirculation of the combustion supporting gas due to the presence of the plate 17 which acts as a baffle. Fuel is introduced into this recirculation zone by means of a nozzle 20. The baffle plate 17 forms a sheltered region in which the fuel is burnt and the flame area is indicated approximately by the dotted line 21. Downstream of the combustion zone the dilution stream which has passed through the passage 18 and the hot burnt gases coming from the enlarged part of the duct 19 mix together in a common duct 22. It will be appreciated that because the diffusing section 18 is introduced in this arrangement there is an appreciable gain in static pressure through the diffuser and therefore a much reduced loss throughout the whole combustion zone. Another consequence is that the velocity of the combustion supporting gas entering the combustion duct, that is at 19, is reduced below that of the gas upstream of the combustion zone so that there is reduced tendency for the flame to be blown out by the high velocity gas stream. The arrangement can be made such that the proportion of combustion supporting gas entering into the larger part of the duct at 19 may be not substantially greater than the quantity required to burn all the fuel that is to be introduced. Hence, even violent turbulence in the stream introduced through the duct 10 cannot seriously diminish the efficiency of the combustion because there is no possibility of pockets of burning fuel being forced out of the combustion zone into the dilution stream and there extinguished. As many of such split combustion ducts as this may be set up in parallel as are compatible with mechanical design and stability of combustion.

Figure 3:
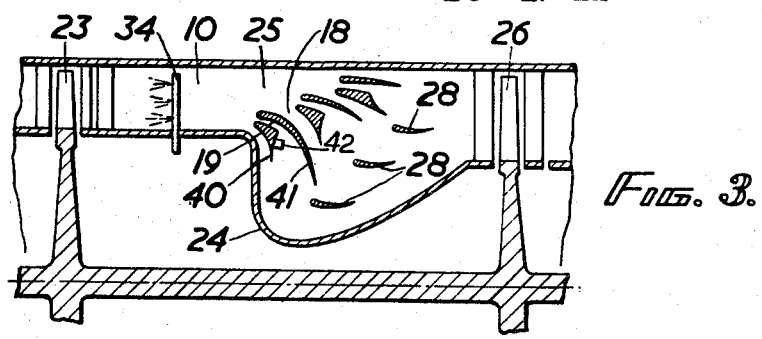
Figure 3 shows diagrammatically part of a gas turbine engine incorporating an annular combustion system based upon the principle disclosed in relation to Figure 2.
Figure 4:
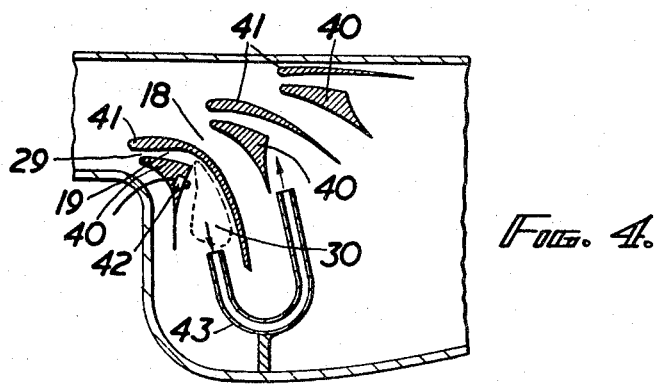
Figure 4 is the combustion portion of the equipment shown in Figure 3 drawn to a larger scale and showing certain modifications.

An arrangement in accordance with the general principle shown in Figure 2 is illustrated in Figures 3 and 4. These figures show a combustion system for use in a gas turbine jet engine. Figure 3 shows an annular duct 10 downstream of an axial flow compressor 23 and leading to an enlarged annular duct in which combustion occurs. At the downstream end of the annular duct there is a turbine 26 mounted on the same shaft as the compressor 23. Only the last stage of the compressor 23 has been shown. The inner wall of the enlarged annular duct or combustion chamber, as it may be called, is smoothly curved as shown at 24 and pairs of deflector plates 40, 41 are disposed across the upstream end 25 of the combustion zone. These deflector plates (which are shown more clearly in Figure 4, which is an enlargement of Figure 3) divide up the oncoming combustion supporting air-stream into dilution air and combustion supporting air. The paths of one pair of adjacent paths are labelled 18 and 19 respectively so that similarity with Figure 2 can be appreciated. A sufficient number of pairs of deflector plates 40, 41 are disposed across the neck of the combustion chamber to cope with sufficient release of heat from the burnt fuel for the operation of the turbine 26. Straightener vanes 28 are indicated downstream of the combustion zone in order to damp out the turbulence in the hot gases passing towards the turbine 26. Referring now to Figure 4 reference 29 represents the upstream end of a combustion path 19 and consists of a parallel-sided passage of sufficient length to damp out large scale turbulence which might be present in the oncoming stream. Fuel is burnt in the recirculating zone which is indicated by a flame shown dotted at 30. The enlargement between the parallel-sided passage and the region occupied by the flame is of the order of 1 to 4. The dilution duct 18 as before is arranged as an efficient diffuser the enlargement of the diffuser being of the order of 1 to 1½. The plates 40, 41 may be provided with apertures, to permit part of the dilution air to flow therethrough for cooling purposes.

The upstream end of the combustion path 19, as has just been stated, damps out large scale turbulence. This is necessary to avoid extinction of the flame. It is however, desirable to have small scale turbulence in order to make the flame shorter, provided of course, that this turbulence is not so intense as to extinguish the flame under the most adverse conditions (e.g. at high altitude). The small scale turbulence may be produced by providing wall irregularities in the path 19. In the duct 10 there is a fuel injector 34 directed in the upstream direction. Fuel is carried by the air stream towards the deflector plates in the combustion chamber. One of the deflector plates 40 carries an igniter 42 which ignites the air/fuel mixture in the associated combustion path. The igniter 42 is a counterpart of and performs the same function as the igniter shown in Figures 1, 3 and 5. The flame may be spread to other combustion paths by a U-shaped spreader tube 43. This arrangement of ignition is particularly suited to idling or part load conditions. When idling, it may be desirable that combustion should only take place in one of the combustion paths 19 and so the path having the igniter may be employed as the "idling" path and also as a pilot for the other combustion paths. When conditions of load are again resumed the flame may be allowed to spread through flame-spreader tube or tubes 43 to other combustion paths 19. The combustion in paths other than the idling path may be controlled by the supply of fuel to these paths, the fuel being supplied, for example, as a liquid spreading in a film over the surface of the plates (as will be described hereinafter). When the idling paths only is required the supply to the other combustion paths would be discontinued. The idling path may be so constructed as to be especially stable (i.e. low velocity and small turbulence) in order to give easy ignition. The irregularities of the walls would not be so pronounced as in the other paths.

Figure 5:
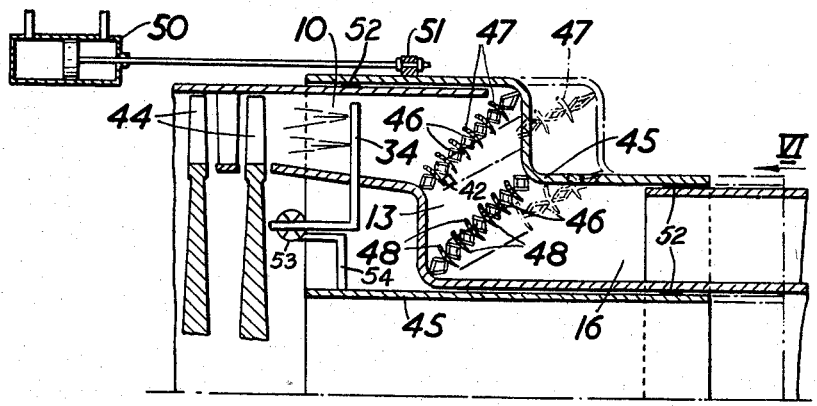
Figure 5 shows afterburning or reheat apparatus for a gas turbine engine.
Figure 6:
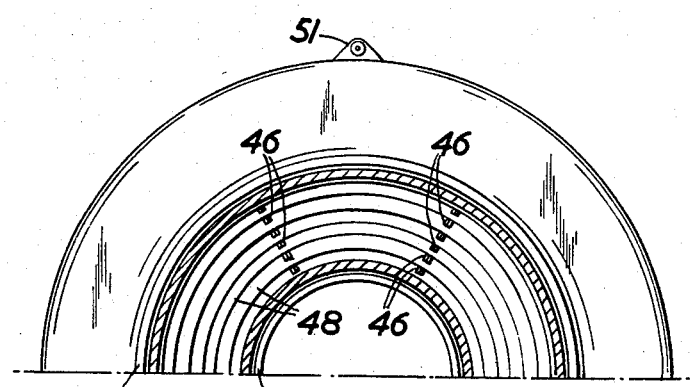
Figure 6 is an end view of Figure 5 in the direction of arrow VI.

Figures 5 and 6 show an embodiment of the invention applied to after-burning or reheat apparatus for a gas turbine jet engine. Reference numerals 10, 13 and 16 show portions of a cranked duct, similar to that shown in Figure 1. Upstream of the duct portion there is shown the gas turbine 44. Fuel for the after-burning apparatus may be injected through a fuel pipe 34 directed in the upstream direction, the fuel being carried downstream by the exhaust gases leaving the turbine 44. The duct 10, 13, 16 is of annular form. The inner wall of the portions 10, 13, 16 and the outer wall of the portion 10 are stationary and form part of the normal gas turbine casing. The outer walls of the portions 13 and 16 however, are constituted by a sleeve 45 surrounding the fixed walls of the duct and mounted for sliding movement in an axial direction. Sealing means 52 are provided to limit or prevent leakage of the gases in the duct between the sliding and fixed walls thereof. The sleeve 45 is slidable between two limiting positions, one as shown by full lines in Figure 5, in which the distances between directly opposite parts of the duct walls in all the portions 10, 13 and 16 are substantially the same and the other, as shown by broken lines in Figure 5, in which the distances between directly opposite parts of the walls in portion 13 are much larger than in portions 10 or 16. At the first right-angled bend between the portions 10 and 13 there is a compressor cascade of aero-foil section blades and at the second right-angled bend between the portion 13 and 16 there is an expansion cascade of aero-foil section blades. The blades are mounted between the fixed walls of the duct and the slidable wall by means of a trellis-like or "lazy-tong" structure 46. When the sleeve is in the position shown in full lines in Figure 5 the trellis-like structures 46 are contracted and when the sleeve 45 is in the position shown by broken lines the trellis-like structures 46 are extended to enable the blades of the cascades 47 and 48 to take up their new positions. The blades of the compressor cascade 47 are so mounted on the trellis-like structure 46 that when the sleeve 45 is in the position shown in full lines, the blades are unstalled and that when the sleeve 45 is in the position shown by broken lines the blades of the compressor cascade 47 are stalled or partially stalled. Means 53 enable the supply of fuel to the pipe 34 to be discontinued when the sleeve 45 is in the position shown in full lines and the blades of the compressor cascade 47 are unstalled. Means 54 interconnects the fuel control means 53 with the movable wall portion 45, whereby the fuel supply through the pipe 34 can be simultaneously interrupted when the blades 47 are unstalled and restored when the blades are stalled. The sleeve 45 is moved between the two positions by means of a hydraulically operated ram 50 connected to a lug 51 integral with the sleeve 45.

The operation of the embodiment shown in Figure 5 and Figure 6 is as follows: when reheat or afterburning is not required, the sleeve 45 is in the position shown in full lines, the compressor cascade 47 is unstalled and no fuel is injected through the pipe 34. The exhaust gases from turbine 44 therefore flow through the duct portions 10, 13 and 16 freely and pass to the jet pipe. When afterburning or reheat is required the sleeve 45 is moved to the position shown by broken lines in Figure 5, the blades of the compressor cascade 47 become stalled and fuel is injected by means of the pipe 34. The fuel is carried in droplet form in the exhaust gas stream to the compressor cascade 47. The stalled blades provide in their wake sheltered regions in which combustion occurs, the portion 13 constituting the combustion zone. The gases then pass through the expansion cascade 48 to the portion 16 and then to the jet pipe.

It will be appreciated that this arrangement provides a satisfactory method of introducing reheat into a gas turbine engine or plant without the normal disadvantage of having considerable losses present due to the reheat combustion equipment, even when it is not functioning. This arrangement is equally applicable to stationary plant or to gas turbine jet engines. A similar arrangement can be incorporated in the by-pass of a by-pass jet engine. Likewise, combustion equipment according to the other embodiments of the invention can also be introduced into various varieties of gas turbine plant, as for example the by-pass jet engine.

Figure 7:
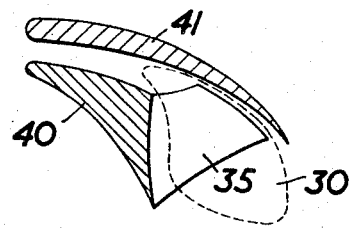
Figures 7 and 8 show details relative to the baffle means and fuel introduction respectively.
Figure 8:
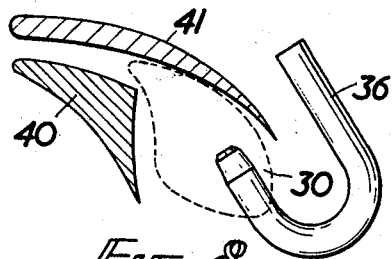

In any of the embodiments described herein, fuel may be introduced into the recirculation zone in the wake of the baffle, whichever form the baffle takes, e.g. compressor cascade blade, plate 17 or plates 40, 41, in several different ways. For instance, it may enter the combustion region as a gaseous mixture with the combustion supporting gas. It may also be sprayed uniformly into the combustion gas upstream of the combustion zone and carried in droplet form with the gas. Such an arrangement has been indicated in Figures 1, 3 and 5 at 34. Alternatively, the fuel may be supplied directly to the surface of the baffle and if that is in the form of the blade as shown in Figure 1 then it is preferred that the film should be introduced on to the back of the blade so as to reduce the tendency for the fuel to blow off. The fuel vaporizes from the surface on which it is introduced as a film. Auxiliary vaporizing surfaces can be introduced within the recirculation zone and these may also be wetted with fuel if this is convenient. This arrangement is shown for example, in Figure 7 where a fin 35 is attached to the back of the blade so as to project into the combustion region. It may be convenient to supply fuel as a gas or vapor directly to the recirculation region (as at 20 in Figure 2) and if that fuel is initially liquid it may be vaporized by passing over any surface swept by the hot gases. Those hot gases may be derived from the flame to which the fuel is supplied or from some other source. Vaporization may occur within a duct preferably into which air has also been introduced. The direct supply of sprayed liquid fuel in the form of droplets into the recirculation region from a point downstream thereof is another possibility. The introduction of fuel directly into the recirculation region is indicated in Figure 8 where the supply tube 36 may be considered as providing either vaporized or liquid fuel into the recirculation region. Where the vaporized fuel is obtained from an adjacent combustion region or path the tube 36 would be equivalent to the flame-spreading tube 43 shown in Figure 4.

When the deflector baffles are convex to the combustion supporting gas as is the case for instance, in the combustion path 19 of Figure 4, they may be of considerable thickness so that they can be made hollow and used to supply the fuel to the combustion region. Liquid fuel may be injected into this region either as a liquid or in vapour form. In the particular arrangement shown in Figure 4 fuel may be supplied as a liquid film to both sides of the combustion duct and vaporized from there.

It is preferred that leading edges of the baffles whether they are blades, deflector plates or duct walls, should be rounded in order to prevent stalling under off design point conditions.

Mention has above been made in passing to gas turbine embodiments of the present invention but it should not be thought that this combustion equipment is exclusively applicable to such plant. The invention may be applied for instance, to ram jets, to helicopter rotor propulsion by jets at the tips thereof, to pressure exchangers and other apparatus involving the production of hot gases, e.g. apparatus for use in the production of acetylene from methane and oxygen or the production of nitric oxide from fuel burning in air, either oxygen-enriched or not. The arangement of Figure 3 is particularly applicable to annular combustion chambers for axial gas turbines, but the invention also makes possible a convenient arrangement of a centrifugal compressor gas turbine engine.

What I claim is:

1. Equipment for burning vaporific fuel in a stream of combustion-supporting gas which comprises a duct defining a path for the said stream, said duct being in the shape of a crank or double L-form with a center portion of cross-sectional area substantially transversely disposed with respect to portions of said duct immediately upstream and downstream therefrom, said center portion thus defining a sudden and substantial enlargement in said duct, a first cascade of blades of aerofoil section positioned in the crank bend of the duct immediately upstream of the said center portion, a second cascade of aerofoil section blades positioned in the crank bend of said duct immediately downstream of the said center portion, said first cascade section causing recirculation of said gas stream through a substantial angle, means for introducing fuel into said duct, and ignition means positioned in said enlargement.

2. Equipment as claimed in claim 1 in which means are provided for moving at least several of said blades between a stalled and an unstalled position.

3. Equipment for burning vaporific fuel in a stream of combustion-supporting gas which comprises a duct defining a path for the said stream, said duct being in the shape of a crank of double L-form with a center portion bounded by a fixed wall portion and a movable wall portion, said movable wall portion being movable between a first position in which the duct is of uniform cross-sectional area throughout its length and a second position in which the said center portion has a cross-sectional area substantially greater than that of the duct immediately upstream of the said center portion, the said center portion thus constituting a sudden and substantial enlargement in the duct, means for moving the said movable wall portion between the said first and second positions, a cascade of blades of aerofoil section positioned in the crank bend of the duct immediately upstream of the said center portion, an extensible structure connected between the said fixed and movable wall portions and so supporting the blades that when the movable wall portion is in the said first position the blades are unstalled and when the movable wall portion is in the said second position the blades are stalled with respect to the said gas stream, the said blades when stalled together with the sudden enlargement causing deflection of the gas stream through a substantial angle and recirculation of the said deflected gas, means for introducing fuel into the duct and ignition means positioned in the said enlargement.

4. Equipment as claimed in claim 3 in which said extensible structure is a "lazy tong" trellis-like mechanism.

5. Equipment as claimed in claim 3 in which said movable wall portion is carried on a sleeve slidable on fixed walls of the duct.

6. Equipment as claimed in claim 3 in which means are provided for interconnecting for said fuel introduction means with said movable wall portion, whereby the fuel supply is simultaneously interrupted when the blades are unstalled and restored when the blades are stalled.

References Cited in the file of this patent
UNITED STATES PATENTS

| | | |
|---|---|---|
| 2,243,467 | Jendrassik | May 27, 1941 |
| 2,375,180 | Vigo | May 1, 1945 |
| 2,414,551 | Pavlecka et al. | Jan. 21, 1947 |
| 2,503,006 | Stalker | Apr. 4, 1950 |
| 2,602,292 | Buckland et al. | July 8, 1952 |
| 2,607,191 | Lee | Aug. 19, 1952 |
| 2,630,679 | Sedille | Mar. 10, 1953 |
| 2,660,859 | Chamberlain | Dec. 1, 1953 |
| 2,775,864 | Karcher | Jan. 1, 1957 |